2,791,528
METAL BACKED PRINT AND METHOD FOR MAKING SAME

Louis O. Gross, Hastings on Hudson, N. Y.

No Drawing. Application April 5, 1955,
Serial No. 499,503

6 Claims. (Cl. 154—129)

The present invention relates to a unique and permanent mounting for prints and to a method for bonding prints to a metal backing. The invention is most immediately applicable to the mounting of prints such as photographs, lithographs, etchings, printed or written documents, and works of art such as paintings and the like, on metal plates that resist corrosion under atmospheric conditions and provide an esthetic and practical support and frame therefor.

In the photographic art, for example, it is the common practice to mount photographs on a paper backing and then to frame the mounted photograph under glass in an effort to preserve the photograph against deterioration under atmospheric conditions and to provide an object having an over-all esthetic appeal. Photographs so mounted and framed leave much to be desired, however, from the standpoint of both preservation and esthetic appeal. The glass covering and frame fall short in providing protection against atmospheric conditions because they do not form an air-tight enclosure and in fact promote condensation behind the glass. Furthermore, glass has the inherent disadvantage of reflecting light and therefore of detracting considerably from the esthetic value of the photograph or document mounted behind it. Finally, the glass provides very little protection against fading of the photograph or yellowing of the paper on which it is mounted. This applies to state documents exhibited in libraries, other framed and mounted documents such as diplomas and the like, etchings and other works of art, as well as to photographs.

I have made the surprising discovery that prints generally and photographs and documents in particular can be permanently and safely bonded to metal backings without injury to the print in a manner that will preserve the print against deterioration and provide it with a background having a superior esthetic appeal. I accomplish this objective by applying to and distributing evenly over the reverse side of the print or the face of the metal backing, or both, an aqueous adhesive composition containing about 27 to 32 parts polyvinyl acetate, about 3 to 5 parts polyvinyl alcohol, about 6 to 12 parts phenol-coumarone-indene resin, about 10 to 15 parts propenyl triacetate, about 1 to 3 parts glycolic acid, about 5 to 8 parts toluol and a trace of sodium tetradecyl sulfonate, the parts being by weight, applying the print to the metal backing and subjecting the print and metal backing to pressure for a time sufficient to obtain a substantially permanent bond.

The formulation of the adhesive is believed critical in that any substantial departures therefrom will result in making the bond less permanent or even impossible, or in staining or otherwise damaging the print. The formulation of the adhesive used in the method of the invention is critical in providing a unique combination of properties that are essential to the success of a process. Among these properties are the ability to stick a fibrous sheet of material such as paper to a metal surface and to make such a bond permanent, to do so without staining or otherwise deleteriously affecting the print and without causing swelling or other distortion thereof, and to provide a sufficient interval of time between application of the adhesive to the print, the metal backing or both, and the actual bonding procedure, within which sufficient slip is present to adjust the position of the print relative to the metal backing.

In the adhesive formulation the polyvinyl acetate is one having a melting point of approximately 150° C.; the polyvinyl alcohol is one of medium viscosity and is at least about 98% hydrolyzed; and the phenol-coumarone-indene resin is one having a melting point of about 85 to 95° C.

The metal backing may be any metal material, preferably of a non-corrosive nature under atmospheric conditions, considered esthetically qualified for the material at hand. My present preference is for an aluminum or stainless steel plate of sufficient thickness in relation to its other dimensions to provide a fairly rigid backing. For superior esthetic values, e. g., where a photograph of given size is mounted on a plate of considerably larger dimensions so that the plate will in effect form a frame for the photograph, I prefer to use an aluminum plate that has been chemically brightened by treatment with phosphoric acid or phosphoric- and nitric acid, as described in U. S. Patents 2,650,156 to Eric Shelton-Jones and 2,650,157 to William C. Cochran.

The advantages and utility of the invention will become further apparent from the following example included to illustrate the best mode contemplated at present for carrying out the invention.

*Example*

A thin film of adhesive having the following formulation

|  | Percent |
|---|---|
| Polyvinyl acetate | 28.7 |
| Toluol | 5.6 |
| Polyvinyl alcohol | 3.09 |
| Phenol-coumarone-indene resin | 11.2 |
| Sodium tetradecyl sulfonate | 0.1 |
| Propenyl triacetate | 11.2 |
| Glycolic acid | 1.4 |
| Water | 38.71 |
|  | 100.00 |

The percentages being by weight, was distributed over the reverse side of a photographic print with a rubber roller. Immediately thereafter the coated print was applied to a chemically brightened aluminum plate of proportionally larger dimensions than the photograph. After precise positioning of the print on the plate, the print was squeegeed to remove excess adhesive between the print and the plate, such excess adhesive being wiped off with a damp cloth. The print and plate were then subjected to heat and pressure for about one-half hour at about 150° F. Slight exudations of adhesive from between the print and the plate were removed with naphtha.

The finished article was an attractively mounted photograph. It was subjected to accelerated aging tests and found to withstand them very much better than a similar photograph mounted in ordinary manner under glass in a frame. Even such extreme tests as transferring the mounted photograph from boiling water to a chamber refrigerated with solid carbon dioxide failed to damage either the photograph, the plate or the bond. Extensive soaking even at high temperature failed to dislodge the photograph from the metal backing.

A photograph similarly applied to a similar aluminum plate, except that the pressure was applied overnight at room temperature, was equal in all respects.

The finished article, made as described, may have applied to it a coating of a transparent material for providing further protection against deterioration resulting from exposure to the atmosphere. This may readily be accomplished, for example, by spraying a film of clear resin such as an acrylic, styrene, vinyl chloride or polyester resin over the face of the article. If protection against fading, such as is caused by the action of ultra-violet light, is also desired, an additive for absorbing ultra-violet light may be incorporated in a compatible coating material before application. Examples of suitable ultra-violet light absorbing additives are various hydroxy and methoxy-substituted benzophenones such as 2-hydroxy-4-methoxybenzophenone, 2-hydroxy-4,4'-dimethoxybenzophenone and 2,2'-dihydroxy-4,4'-dimethoxybenzophenone which are compatible with such materials as cellulose, ethylcellulose, polystyrene, polyesters, polyvinyl chloride, vinyl chloride-vinyl acetate copolymers and acrylic polymers and copolymers such as methyl methacrylate polymer, and are effective when incorporated in the coating material in amounts as little as about 0.01% by weight.

It is to be expected that many modifications of the method will occur to those skilled in the art upon reading this description. All such modifications are intended to be included within the scope of the invention as defined in the appended claims.

I claim:

1. Method for mounting a print on a metal backing which comprises evenly distributing, between the reverse side of the print and the face of the metal backing, a film of an aqueous adhesive containing about 27 to 32 parts polyvinyl acetate, about 3 to 5 parts polyvinyl alcohol, about 6 to 12 parts phenol-coumarone-indene resin, about 10 to 15 parts propenyl triacetate, about 1 to 3 parts glycolic acid, about 5 to 8 parts toluol and a trace of sodium tetradecyl sulfonate, the parts being by weight, applying the print to the face of the metal backing, and applying pressure to the print and metal backing for approximately one-half hour at a temperature of approximately 150° F.

2. Method for mounting a print on a metal backing which comprises evenly distributing, between the reverse side of the print and the face of the metal backing, a film of an aqueous adhesive containing about 28.7 parts polyvinyl acetate, about 3.1 parts polyvinyl alcohol, about 11.2 parts phenol-coumarone-indene resin, about 11.2 parts propenyl triacetate, about 1.4 parts glycolic acid, about 5.6 parts toluol and about 0.1 part sodium tetradecyl sulfonate, the parts being by weight, applying the print to the face of the metal backing, and applying pressure to the print and metal backing for approximately one-half hour at a temperature of approximately 150° F.

3. The combination of a print bonded substantially permanently to a metal backing with an aqueous adhesive containing about 27 to 32 parts polyvinyl acetate, about 3 to 5 parts polyvinyl alcohol, about 6 to 12 parts phenol-coumarone-indene resin, about 10 to 15 parts propenyl triacetate, about 1 to 3 parts glycolic acid, about 5 to 8 parts toluol and a trace of sodium tetradecyl sulfonate, the parts being by weight.

4. The combination of a print bonded substantially permanently to a metal backing with an aqueous adhesive containing about 28.7 parts polyvinyl acetate, about 3.1 parts polyvinyl alcohol, about 11.2 parts phenol-coumarone-indene resin, about 11.2 parts propenyl triacetate, about 1.4 parts glycolic acid, about 5.6 parts toluol and about 0.1 part sodium tetradecyl sulfonate, the parts being by weight.

5. The combination of a print bonded substantially permanently to a metal backing with an aqueous adhesive containing about 27 to 32 parts polyvinyl acetate, about 3 to 5 parts polyvinyl alcohol, about 6 to 12 parts phenol-coumarone-indene resin, about 10 to 15 parts propenyl triacetate, about 1 to 3 parts glycolic acid, about 5 to 8 parts toluol and a trace of sodium tetradecyl sulfonate, the parts being by weight, and covered with a coating of a transparent resin.

6. The combination of a print bonded substantially permanently to a metal backing with an aqueous adhesive containing about 27 to 32 parts polyvinyl acetate, about 3 to 5 parts polyvinyl alcohol, about 6 to 12 parts phenol-coumarone-indene resin, about 10 to 15 parts propenyl triacetate, about 1 to 3 parts glycolic acid, about 5 to 8 parts toluol and a trace of sodium tetradecyl sulfonate, the parts being by weight, and covered with a coating of a transparent resin containing an ultra-violet light absorbing additive.

References Cited in the file of this patent

UNITED STATES PATENTS

| | | |
|---|---|---|
| 1,986,954 | Abrams et al. | Jan. 8, 1935 |
| 1,999,413 | Hemming et al. | Apr. 30, 1935 |
| 2,010,867 | Kumbo | Aug. 13, 1935 |
| 2,481,896 | Ziegler | Sept. 13, 1949 |